(12) United States Patent
Iizuka

(10) Patent No.: US 9,331,778 B2
(45) Date of Patent: May 3, 2016

(54) INFORMATION PROVISION SYSTEM, SERVER SYSTEM, TERMINAL DEVICE, INFORMATION PROVISION METHOD, AND RECORDING MEDIUM

(71) Applicant: CASIO COMPUTER CO., LTD., Shibuya-ku, Tokyo (JP)

(72) Inventor: Nobuo Iizuka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 98 days.

(21) Appl. No.: 14/153,565

(22) Filed: Jan. 13, 2014

(65) Prior Publication Data

US 2014/0199082 A1    Jul. 17, 2014

(30) Foreign Application Priority Data

Jan. 17, 2013    (JP) .................................. 2013-006689

(51) Int. Cl.
*H04B 10/114* (2013.01)
*H04B 10/116* (2013.01)

(52) U.S. Cl.
CPC ............ *H04B 10/116* (2013.01); *H04B 10/114* (2013.01); *H04B 10/1143* (2013.01); *H04B 10/1149* (2013.01)

(58) Field of Classification Search
None
See application file for complete search history.

(56) References Cited

U.S. PATENT DOCUMENTS 7,308,194 B2    12/2007  Iizuka et al.
2002/0141011 A1*  10/2002  Green et al. ....... H04B 10/1123
                                                         398/127

FOREIGN PATENT DOCUMENTS

| JP | 2006-020294 A | 1/2006 |
| JP | 2006180217 A | 7/2006 |
| JP | 2009159044 A | 7/2009 |

OTHER PUBLICATIONS

Japanese Office Action dated Oct. 28, 2014, issued in counterpart Japanese Application No. 2013-006689.

* cited by examiner

*Primary Examiner* — Darren E Wolf
(74) *Attorney, Agent, or Firm* — Holtz, Holtz & Volek PC

(57) ABSTRACT

A portable terminal sends to a second server sound contents request information comprising a tag ID corresponding to light received from an illumination device, the light-receiving position on the light-receiving surface, and the area ratio of the light-receiving range to the light-receiving surface in order to acquire sound contents. The second server 700 combines individual sound contents corresponding to the tag ID in the sound contents request information, first basic sound contents corresponding to the light-receiving position, and second basic sound contents corresponding to the area ratio. Then, the second server creates sound contents for giving information about the object present at the location where the illumination device emitting the light corresponding to the tag ID is installed and the direction and distance of the object when seen from the portable terminal and sends the sound contents to the portable terminal.

7 Claims, 8 Drawing Sheets

FIG. 4
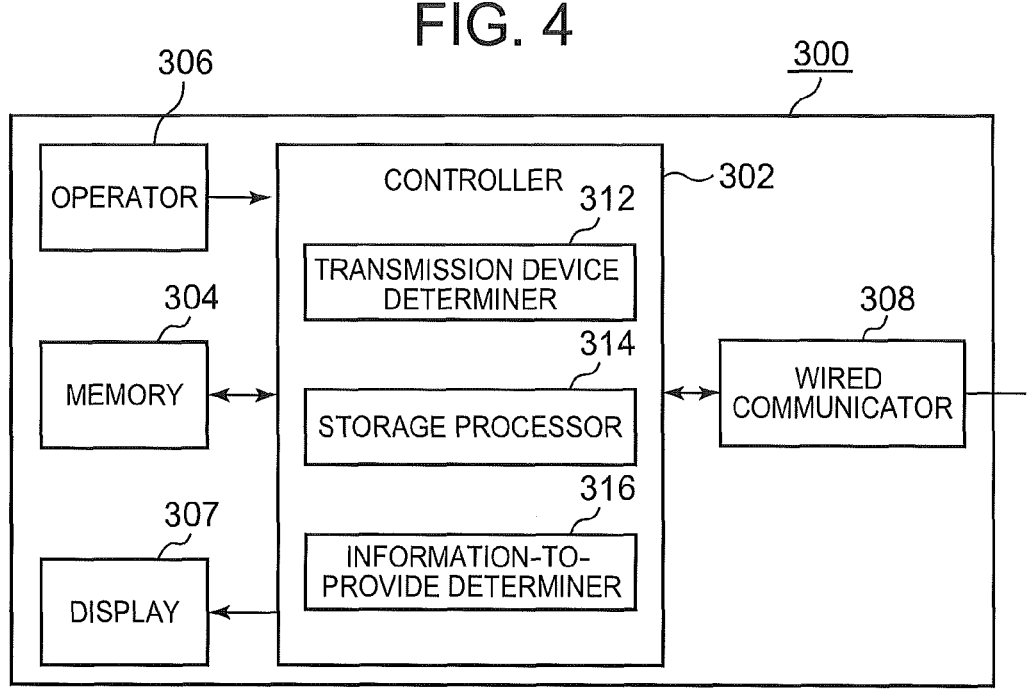
FIG. 5
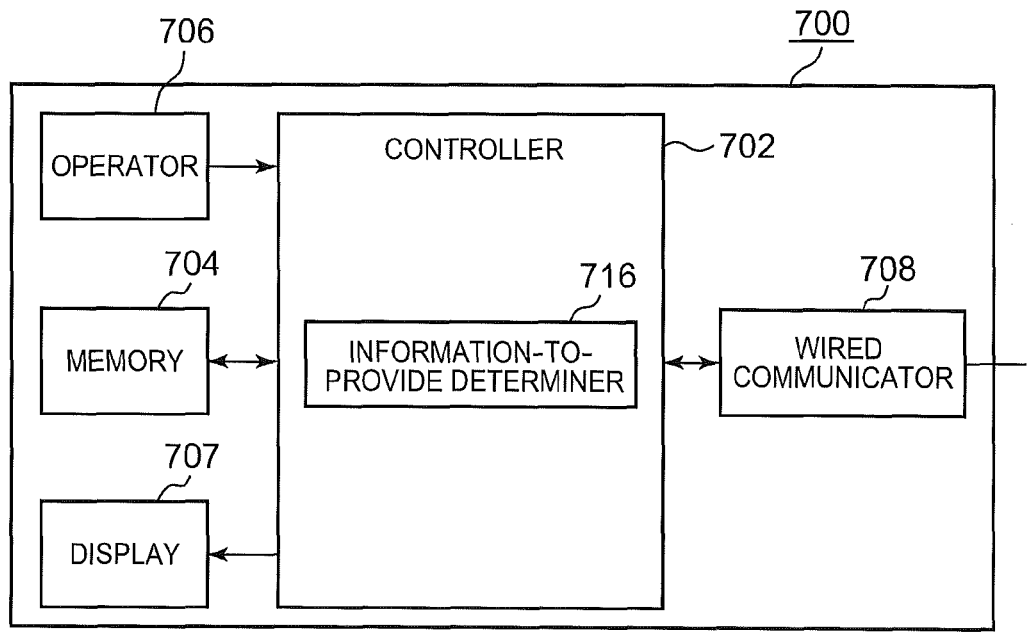
FIG. 6
| DEVICE ID | DEVICE LOCATION INFORMATION | TAG ID_a | CONTENTS CORRESPONDING TO TAG ID_a |
|---|---|---|---|

FIG. 9
| TERMINAL ID | TERMINAL LOCATION INFORMATION | TAG ID_a | TAG ID_b | .... |
|---|---|---|---|---|
FIG. 10
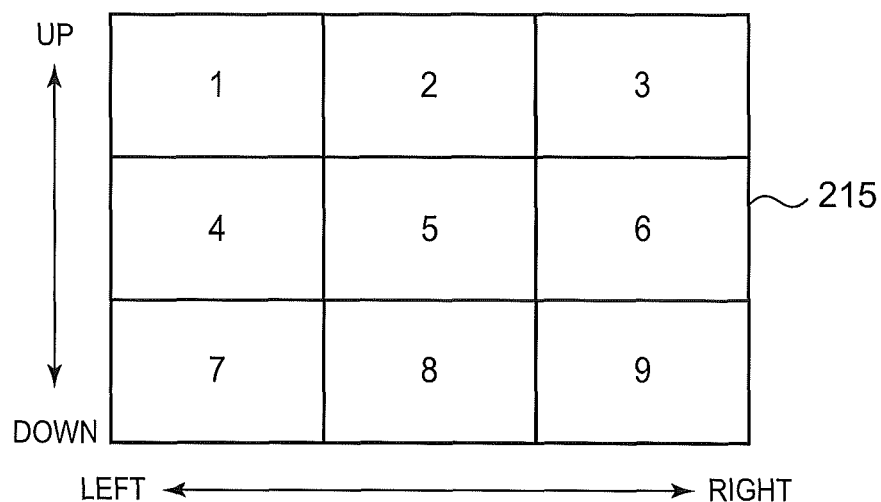
FIG. 11
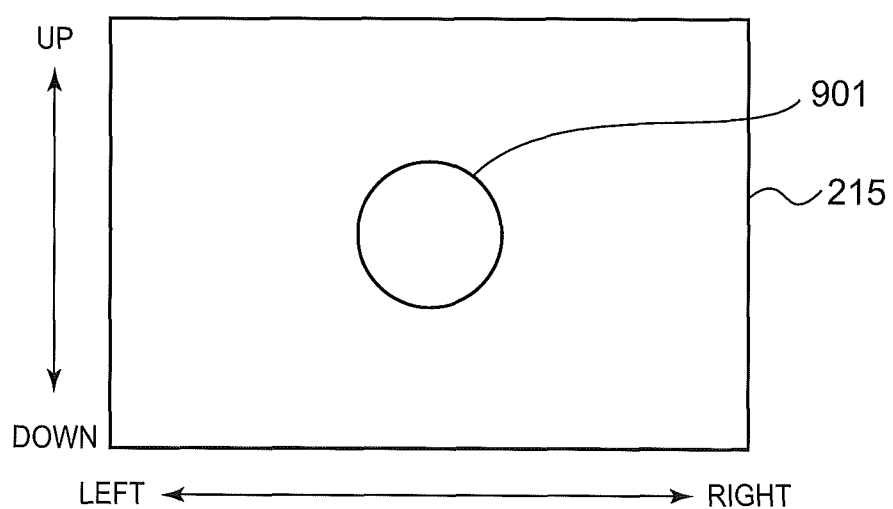

FIG. 12

| TAG ID_a | LIGHT-RECEIVING POTISION INFORMATION | AREA RETIO INFORMATION | .... |
|---|---|---|---|

FIG. 13

| TAG ID_a | INDIVIDUAL SOUND CONTENTS |
|---|---|

FIG. 14

| LIGHT-RECEIVING POSITION | FIRST BASIC SOUND CONTENTS |
|---|---|
| 1 | UPPER LEFT |
| 2 | UP |
| 3 | UPPER RIGHT |
| 4 | LEFT |
| 5 | IN FRONT |
| 6 | RIGHT |
| 7 | LOWER LEFT |
| 8 | DOWN |
| 9 | LOWER RIGHT |

FIG. 15

| AREA RATIO OF LIGHT-RECEIVING RANGE TO ENTIRE LIGHT-RECEIVING SURFACE | SECOND BASIC SOUND CONTENTS |
|---|---|
| 30 % AND HIGHER | VERY CLOSE |
| MORE THAN 5 % TO LOWER THAN 30% | |
| LOWER THAN 5 % | FAR |

INFORMATION PROVISION SYSTEM, SERVER SYSTEM, TERMINAL DEVICE, INFORMATION PROVISION METHOD, AND RECORDING MEDIUM

CROSS-REFERENCE TO RELATED APPLICATION

This application claims the benefit of Japanese Patent Application No. 2013-006689, filed on Jan. 17, 2013, the entire disclosure of which is incorporated by reference herein.

FIELD

This application relates to an information provision system, server system, terminal device, information provision method, and recording medium.

BACKGROUND

Optical communication techniques of processing time-series images (frames) captured by image sensors are known. For example, in Unexamined Japanese Patent Application Kokai Publication No. 2006-20294, assuming that outdoor illumination or the like is used as a transmission device emitting light modulated to information, a terminal device can acquire the information by photographing the transmission device with the camera installed therein and demodulating the received light.

Furthermore, in a recent scheme, instead of transmitting information directly, a transmission device emits light modulated according to information ID, a terminal device demodulates and decodes the received light to obtain the ID and sends the ID to the server or the like, and then the terminal device acquires the provided information corresponding to the ID from the server or the like.

In the prior art, the user can acquire the provided information by aligning the imaging direction of the camera provided to the terminal device to photograph a transmission device with the direction in which the transmission device is present.

However, if the user is not able to visually locate the transmission device, needless to say, the user cannot align the imaging direction with the direction in which the transmission device is present.

SUMMARY

An exemplary objective of the present invention is to provide effective information when a transmission device cannot visually be located.

In order to achieve the above objective, the invention of the present application provides an information provision system including transmission devices, a terminal device, a server system transmitting information-to-provide to the terminal device, wherein the transmission devices comprise:

a first transmitter modulating given identification information and transmitting the modulated contents using light as the communication medium, the terminal device comprises:

a light receiver comprising a light-receiving surface comprising multiple light-receiving elements two-dimensionally arrayed;

an identification information acquirer demodulating the light to acquire the identification information when the light received by the light receiver is the light transmitted by the first transmitter;

a light-receiving condition acquirer acquiring the light-receiving conditions on the light receiver; and a second transmitter transmitting the identification information acquired by the identification information acquirer and the light-receiving conditions acquired by the light-receiving condition acquirer to the server system, and the server system comprises:

a storage storing information-to-provide associated with the identification information and light-receiving conditions;

a first receiver receiving the identification information and light-receiving conditions from the second transmitter;

a first determiner determining the information-to-provide to transmit based on the identification information and light-receiving conditions received by the first receiver and the stored contents of the storage; and a third transmitter transmitting the information-to-provide determined by the first determiner to the terminal device.

Furthermore, in order to achieve the above objective, the invention of the present application provides a server system in an information provision system including transmission devices, a terminal device, and the server system transmitting information-to-provide to the terminal device, comprising:

a storage storing information-to-provide associated with given identification information and light-receiving conditions of light modulated to the identification information on the terminal device;

a receiver receiving the identification information of light modulated by the transmission device and the light-receiving conditions of the light on the terminal device from the terminal device;

a determiner determining information-to-provide to transmit based on the identification information and light-receiving conditions received by the receiver and the stored contents of the storage; and a transmitter transmitting the information-to-provide determined by the determiner to the terminal device.

Furthermore, in order to achieve the above objective, the invention of the present application provides a terminal device in an information provision system including transmission devices, the terminal device, and a server system providing information-to-provide to the terminal device, comprising:

a light receiver comprising a light-receiving surface comprising multiple light-receiving elements two-dimensionally arrayed;

an identification information acquirer demodulating light transmitted from the transmission devices and received by the light receiver to acquire given identification information;

a light-receiving condition acquirer acquiring the light-receiving conditions on the light receiver; and a transmitter transmitting the identification information acquired by the identification information acquirer and the light-receiving conditions acquired by the light-receiving condition acquirer to the server system.

Furthermore, in order to achieve the above objective, the invention of the present application provides an information provision method of a server system in an information provision system including transmission devices, a terminal device, and the server system providing information-to-provide to the terminal device, comprising:

a storing step of storing in a storage information-to-provide associated with given identification information and light-receiving conditions of light modulated to the identification information;

a reception step of receiving the identification information and light-receiving conditions from the terminal device;

a determination step of determining information-to-provide to transmit based on the identification information and light-receiving conditions received in the reception step and the stored contents of the storage; and a transmission step of transmitting the information-to-provide determined in the determination step to the terminal device.

Furthermore, in order to achieve the above objective, the invention of the present application provides an information provision method of a terminal device in an information provision system including transmission devices, the terminal device, and a server system providing information-to-provide to the terminal device, comprising:

a light reception step of receiving light from the transmission devices with a receiver;

an identification information acquisition step of demodulating the light received in the light reception step to acquire given identification information;

a light-receiving condition acquisition step of acquiring the light-receiving conditions in the light reception step;

a transmission step of transmitting the identification information acquired in the identification information acquisition step and the light-receiving conditions acquired in the light-receiving condition acquisition step to the server system;

a reception step of receiving information-to-provide transmitted by the server system in response to the identification information and light-receiving conditions transmitted in the transmission step; and an output step in which an outputter effects output based on the information-to-provide received in the reception step.

Furthermore, in order to achieve the above objective, the invention of the present application records the programs that allow a computer of a server system in an information provision system including transmission devices, a terminal device, and the server system providing information-to-provide to the terminal device to function as:

a storage storing information-to-provide associated with given identification information and light-receiving conditions of light modulated to the identification information;

a receiver receiving the identification information and light-receiving conditions from the terminal device;

a determiner determining information-to-provide to transmit based on the identification information and light-receiving conditions received by the receiver and the stored contents of the storage; and a transmitter transmitting the information-to-provide determined by the determiner to the terminal device.

Furthermore, in order to achieve the above objective, the invention of the present application records the programs that allow a computer of a terminal device in an information provision system including transmission devices, the terminal device, and a server system providing information-to-provide to the terminal device to function as:

an identification information acquirer demodulating light transmitted from the transmission devices and received by a light receiver comprising a light-receiving surface comprising multiple light-receiving elements two-dimensionally arrayed to acquire given identification information;

a light-receiving condition acquirer acquiring the light-receiving conditions on the light receiver;

a transmitter transmitting the identification information acquired by the identification information acquirer and the light-receiving conditions acquired by the light-receiving condition acquirer to the server system;

a receiver receiving information-to-provide transmitted by the server system in response to the identification information and light-receiving conditions transmitted by the transmitter; and an output controller controlling an outputter to output based on the information-to-provide received by the receiver.

BRIEF DESCRIPTION OF THE DRAWINGS

A more complete understanding of this application can be obtained when the following detailed description is considered in conjunction with the following drawings, in which:

FIG. 4 is a diagram showing an exemplary configuration of the first server according to the embodiment;

FIG. 5 is a diagram showing an exemplary configuration of the second server according to the embodiment;

FIG. 6 is a diagram showing an example of the device information according to the embodiment;

FIG. 9 is a diagram showing an example of the inquiry information according to the embodiment;

FIG. 10 is a diagram showing exemplary light-receiving positions on the imaging element according to the embodiment;

FIG. 11 is a diagram showing an exemplary light-receiving range on the imaging element according to the embodiment;

FIG. 12 is a diagram showing an example of the sound contents request information according to the embodiment;

FIG. 13 is a diagram showing an example of the individual sound contents information according to the embodiment;

FIG. 14 is a diagram showing exemplary correspondence between the light-receiving positions and the first basic sound contents according to the embodiment; and FIG. 15 is a diagram showing exemplary correspondence between the light-receiving ranges and the second basic sound contents according to the embodiment.

DETAILED DESCRIPTION

The information provision system according to an embodiment of the resent invention will be described hereafter with reference to the drawings.

Figure 1:
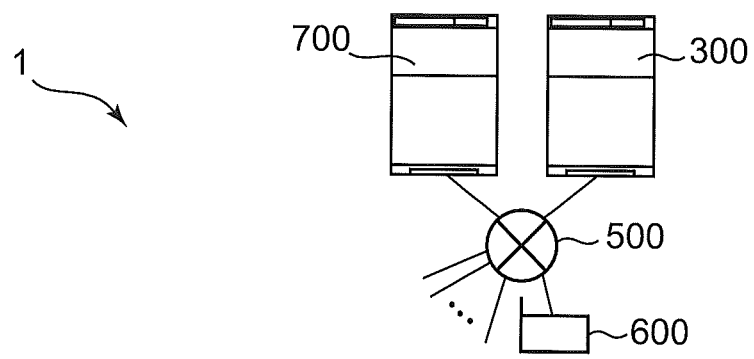
FIG. 1 is an illustration showing an exemplary arrangement of transmission devices, a portable terminal, and servers constituting the information provision system according to an embodiment of the present invention.
Figure 1:
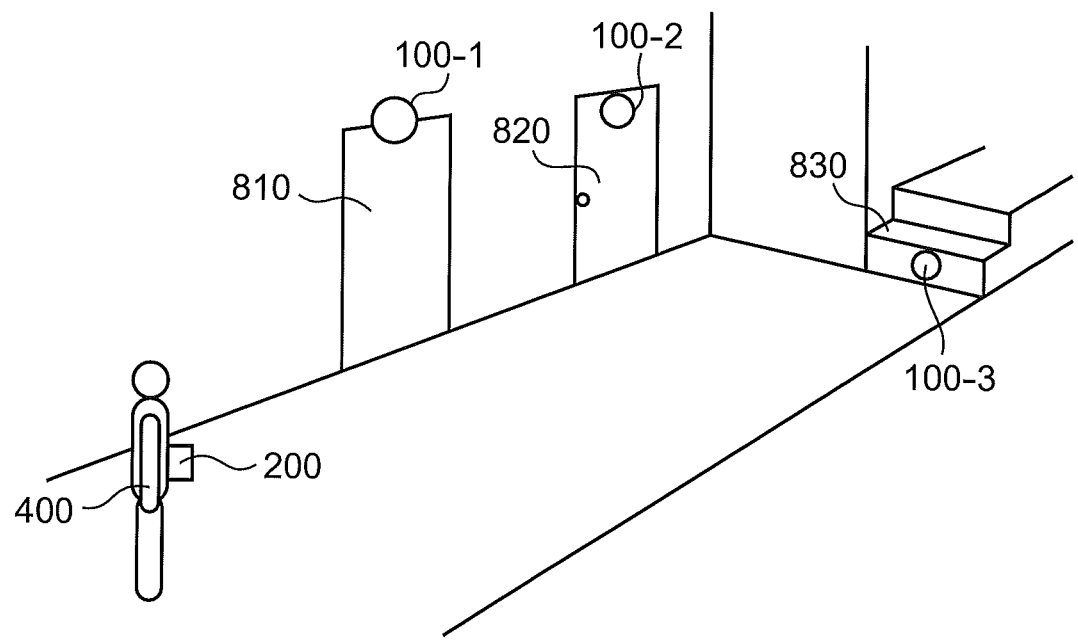

As shown in FIG. 1, an information provision system 1 comprises illumination devices 100-1 to 100-3 (hereafter, the illumination devices 100-1 to 100-3 are collectively referred to as the illumination devices 100 as appropriate) as transmission devices, a portable terminal 200 as a terminal device, and a first server 300 and a second server 700 constituting a server system.

The illumination devices 100 emit light into a room where a user 400 is present. In this embodiment, the illumination device 100-1 is installed at an emergency exit 810, the illumination device 100-2 is installed on a restroom door 820, and the illumination device 100-3 is installed on a step 830.

Furthermore, the illumination devices 100 emit light modulated in accordance with an ID (tag ID) that is the identification information of contents provided to the portable terminal 200 from the first server 300.

The portable terminal 200 is a portable terminal with wireless communication capability such as a cell-phone, smart phone, tablet-type personal computer, and note-type personal computer. The portable terminal 200 is carried around by the user 400. Here, in this embodiment, when the user 400 carries around the portable terminal 200, the user 400 wears the portable terminal 200 so that the imager 214 of the portable terminal 200, which will be described later, is oriented in the traveling direction while the user 400 moves. In FIG. 1, the user 400 wears the portable terminal 200 by dangling it from his neck. However, this is not restrictive. The portable terminal 200 can be of a head-mounted type and the imager 214 of the portable terminal 200 is placed so that the direction of the sight line of the user 400 and the imaging direction align. Alternatively, the portable terminal 200 can be in the form of a walking aid (for example, a cane) and the imager 214 of the portable terminal 200 is placed so that the direction of movement of the user 400 and the imaging direction align. In other words, in this embodiment, it does not matter what shape the portable terminal 200 has or how the portable terminal 200 is held/worn as long as the imager 214 is provided in the manner that the travelling direction or direction of the sight line of the user 400 and the imaging direction align. Furthermore, the portable terminal 200 receives light from the illumination devices 100 to acquire tag IDs and sends the tag IDs to the first server 300 via a wireless base station 600 and a communication network 500.

The first server 300 communicates with the illumination devices 100 via the communication network 500. Furthermore, the first server 300 communicates with the portable terminal 200 via the communication network 500 and wireless base station 600. The first server 300 manages the contents and tag IDs and sends to the portable terminal 200 the contents corresponding to the tag ID from the portable terminal 200.

When the contents from the first server 300 are those used for acquiring sound contents of the second server 700, the portable terminal 200 accesses the second server 700 via the wireless base station 600 and communication network 500 and sends sound contents request information described later in order to acquire sound contents that are information-to-provide regarding the location of the illumination device 100 that has emitted the light corresponding to the acquired tag ID. On the other hand, when the contents from the first server 300 are not those used for acquiring sound contents of the second server 700, the portable terminal 200 executes a procedure to output the contents from the first server 300 (for example, image display).

The second server 700 communicates with the portable terminal 200 via the communication network 500 and wireless base station 600. The second server 700 manages the sound contents and tag IDs, and sends to the portable terminal 200 the sound contents in accordance with sound contents request information from the portable terminal 200. The portable terminal 200 outputs the sound of the received sound contents so as to provide the sound contents to the user 400.

Figure 2:
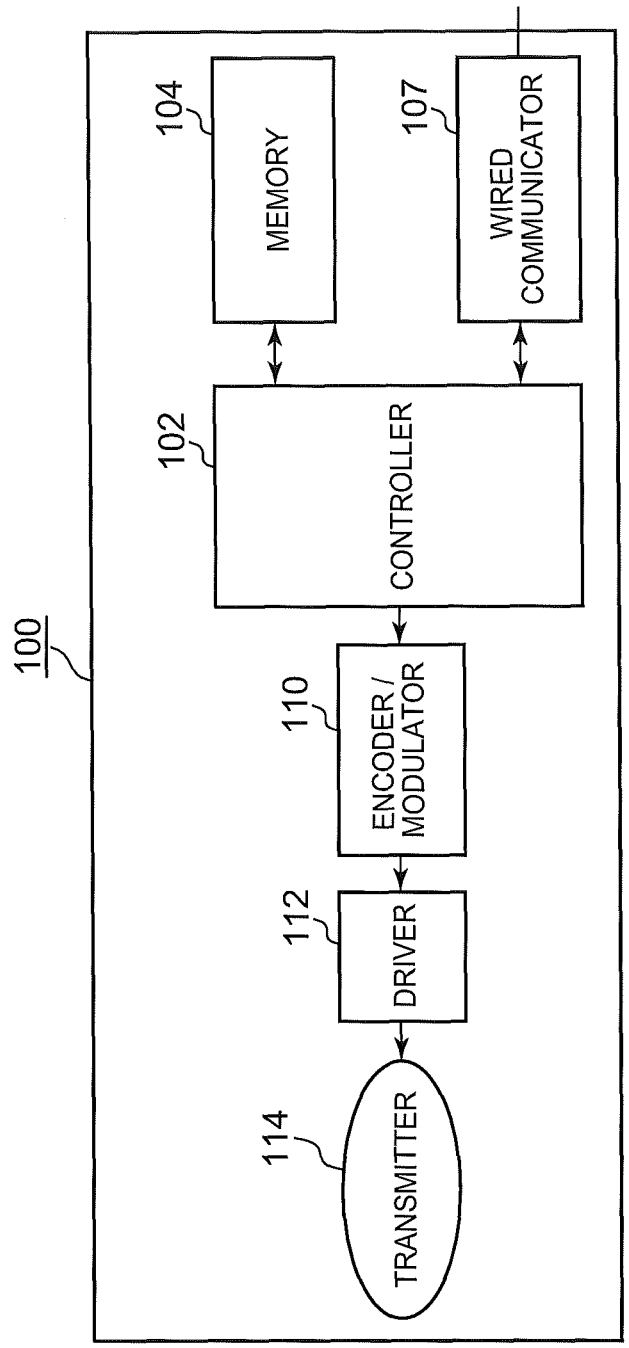
FIG. 2 is a diagram showing an exemplary configuration of an illumination device according to the embodiment.

The detailed configuration of the illumination devices 100 will be described hereafter. As shown in FIG. 2, the illumination devices 100 each comprise a controller 102, a memory 104, a wired communicator 107, an encoder/modulator 110, a driver 112, and a transmitter 114.

The controller 102 comprises, for example, a CPU (central processing unit). The controller 102 executes software procedures according to the programs stored in the memory 104 to control the functions of the illumination device 100. The memory 104 is, for example, a RAM (random access memory) or ROM (read only memory). The memory 104 stores various kinds of information (programs and the like) used for controlling the illumination device 100. The wired communicator 107 is, for example, a LAN (local area network) card. The wireless communicator 107 communicates with the first server 300 via the communication network 500.

The encoder/modulator 110 encodes data output from the controller 102 to a bit data string. Furthermore, the encoder/modulator 110 executes digital modulation based on the bit data string. Any encoding scheme and modulation scheme can be utilized. However, a desirable modulation scheme is 4 PPM (pulse position modulation) using a carrier wave of a frequency of 28.8 (kHz). The driver 112 creates drive signals corresponding to the signals output from the encoder/modulator 110 and used for temporally changing the wavelength of light emitted by the transmitter 114.

The transmitter 114 is, for example, a LED (light emitting diode). The transmitter 114 emits light modulated so as to temporally change its wavelength (color) in accordance with the drive signals output from the driver 112. Here, in this embodiment, the transmitters 114 of the illumination devices 100-1 to 100-3 all have the same light-emitting surface in shape and area.

Figure 3:
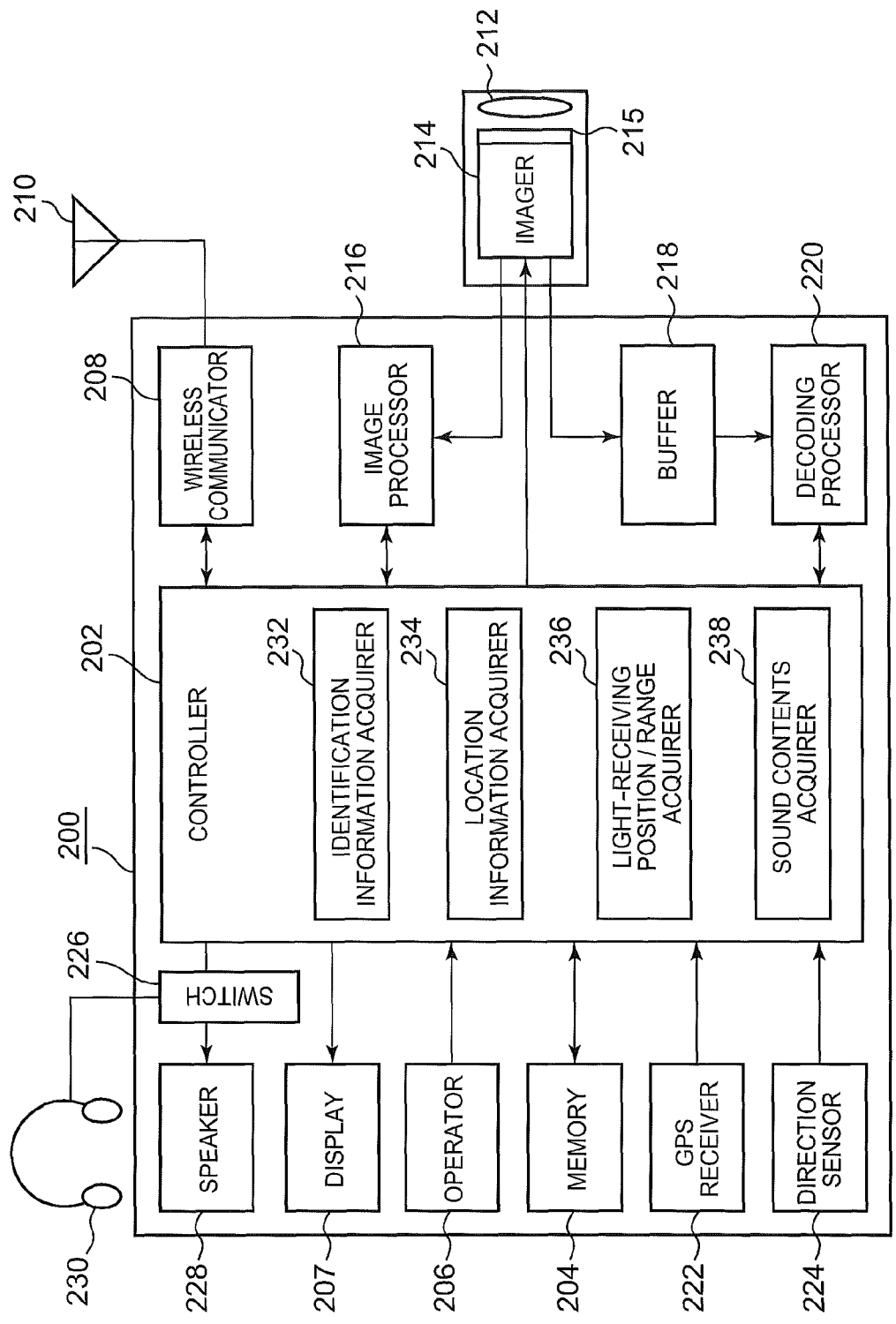
FIG. 3 is a diagram showing an exemplary configuration of the portable terminal according to the embodiment.

The detailed configuration of the portable terminal 200 will be described hereafter. As shown in FIG. 3, the portable terminal 200 comprises a controller 202, a memory 204, an operator 206, a display 207, a wireless communicator 208, an antenna 210, a lens 212, an imager 214, an image processor 216, a buffer 218, a decoding processor 220, a GPS (global positioning system) receiver 222, a direction sensor 224, a switch 226, a speaker 228, and a headphone 230.

The controller 202 comprises, for example, a CPU. The controller 202 executes software procedures according to the programs (for example, the programs for realizing the operation of the portable terminal 200 shown in FIGS. 14 and 15 described later) stored in the memory 204, and has an identification information acquirer 232, a location information acquirer 234, a light-receiving position/range acquirer 236, and a sound contents acquirer 238 for realizing various functions of the portable terminal 200. The memory 204 is, for example, a RAM or ROM. The memory 204 stores various kinds of information (programs and the like) used for controlling the portable terminal 200.

The operator 206 comprises a numeric keypad and function keys or the like and serves as an interface used for input of user operation details. The display 207 comprises, for example, a LCD (liquid crystal display), PDP (plasma display panel), EL (electroluminescence) display, or the like. The display 207 displays images (for example, through-the-lens images described later) according to image signals output from the controller 202.

The wireless communicator 208 comprises, for example, a radio frequency (RF) circuit, base band (BB) circuit, or the like. The wireless communicator 208 transmits/receives radio signals via the antenna 210. Furthermore, the wireless communicator 208 encodes and modulates transmission signals, and demodulates and decodes received signals.

The lens 212 has optical characteristics adjusted so as to be able to capture images in a wide-angle range.

The imager 214 comprises multiple light-receiving elements regularly arranged in a two-dimensional array. The light-receiving elements are imaging devices such as CCDs (charge coupled devices) and CMOSs (complementary metal oxide semiconductors). The imager 214 captures (receives)

an optical image entering via the lens 212 in a given imaging field angle range based on the control signals from the controller 202, converts the image signals within the imaging field angle to digital data, corrects the rotation of the imaging field angle in consideration of the horizontal/vertical components with respect to the vertical direction if necessary, and creates a frame. Furthermore, the imager 214 temporally successively captures an image and creates a frame, outputs the successive frames to the image processor 216, and sequentially stores and updates the successive frames in the buffer 218.

Furthermore, the imager 214 determines whether there is any color change at the same coordinates in a given quantity of frames. As a result of determination, if there is given color change at given coordinates within the imaging field angle, it is assumed that the given coordinates have received light from the transmitter 114 and therefore been subjected to given color change. If given color change has occurred, the imager 214 stores and updates the coordinates of the position in the frames where the color change has occurred ("the color change coordinates," hereafter) and a bit data string presenting the temporal color change mode at the color change coordinates in a given quantity of frames in a coordinates data list created in the buffer 218.

The image processor 216 adjusts the frame (digital data) output from the imager 214 in image quality and size based on the control signals from the controller 202 and outputs the frame to display it as a through-the-lens image on the display 207. Furthermore, the image processor 216 has the function of encoding and filing an optical image within the imaging field angle on the imager 214 at the time of a recording order or within the display range displayed on the display 207 using a compression encoding scheme such as JPEG (joint photographic experts group) upon input of control signals based on a recording order operation from the operator 206. The decoding processor 220 decodes the bit data string presenting the color change mode stored in the coordinates data list in the buffer 218 to digital data based on the control signals from the controller 202. Any decoding scheme corresponding to the encoding scheme of the encoder/modulator 100 of the illumination device 100 can be used.

The GPS receiver 222 receives signals from a GPS satellite and measures the location (latitude and longitude) of the portable terminal 200 based on the signals. The direction sensor 224 detects the direction of imaging by the imager 214 based on geomagnetic changes or the like.

Operated by the user 400, the switch 226 switches the output destination of sound. The speaker 228 and headphone 230 each output the sound when selected as the sound output destination by the switch 226. Here, when the sound is output via the speaker 228, the sound is output in a sound volume that does not make the sound inaudible due to the surrounding noise. When the sound is output via the headphone 230, the sound is output in a stereo system utilizing the sound image localization.

The detailed configuration of the first server 300 will be described hereafter. As shown in FIG. 4, the first server 300 comprises a controller 302, a memory 304, an operator 306, a display 307, and a wired communicator 308.

The controller 302 comprises, for example, a CPU. The controller 302 executes software procedures according to the programs (for example, the programs for realizing the operation of the first server 300 shown in FIGS. 13 and 14 described later) stored in the memory 304, and has a transmission device determiner 312, a storage processor 314, and a information-to-provide determiner 316 for controlling various functions of the first server 300. The memory 304 is, for example, a RAM or ROM. The memory 304 stores various kinds of information (programs and the like) used for controlling the first server 300.

The operator 306 comprises a numeric keypad and function keys or the like and serves as an interface used for input of user operation details. The display 307 comprises, for example, a LCD, PDP, EL display, or the like. The display 307 displays images according to image signals output from the controller 302. The wired communicator 308 is, for example, a LAN card. The wired communicator 308 communicates with the illumination devices 100 and portable terminal 200 via the communication network 500.

The detailed configuration of the second server 700 will be described hereafter. As shown in FIG. 5, the second server 700 comprises a controller 702, a memory 704, an operator 706, a display 707, and a wired communicator 708.

The controller 702 comprises, for example, a CPU. The controller 702 executes software procedures according to the programs (for example, the programs for realizing the operation of the second server 700 shown in FIGS. 14 and 15 described later) stored in the memory 704, and has a information-to-provide determiner 716 for controlling various functions of the second server 700. The memory 704 is, for example, a RAM or ROM. The memory 704 stores various kinds of information (programs and the like) used for controlling the second server 700.

The operator 706 comprises a numeric keypad and function keys or the like and serves as an interface used for input of user operation details. The display 707 comprises, for example, a LCD, PDP, EL display, or the like. The display 707 displays images according to image signals output from the controller 702. The wired communicator 708 is, for example, a LAN card. The wired communicator 708 communicates with the portable terminal 200 via the communication network 500.

The operation of the information provision system 1 will be described hereafter.

The memory 304 of the first server 300 stores device information as shown in FIG. 6 in advance, which is prepared for each illumination device 100. The device information is information associating an illumination device 100, the tag ID corresponding to the light emitted by the illumination device 100, and the contents corresponding to the tag ID. The device information comprises the device ID of an illumination device 100, location information (device location information comprising the latitude and longitude) of the illumination device 100, a tag ID transmitted by the illumination device 100, and contents data corresponding to the tag ID. Here, when there is no tag ID transmitted by the illumination device 100, the device information contains no tag ID or contents.

The first server 300 sends a tag ID to an illumination device 100. As the illumination device 100 receives the tag ID, the controller 302 of the first server 300 reads the device information from the memory 304 and determines that the transmission destination of the tag ID in the device information is the illumination device 100 corresponding to the device ID in the device information. Furthermore, the controller 302 outputs the tag ID to the wired communicator 308 and further outputs to the wired communicator 308 the IP (Internet protocol) address and MAC (media access control) address or the like corresponding to the illumination device 100. The wired communicator 308 sends the tag ID to the IP address and MAC address or the like corresponding to the illumination device 100 as the destination. The wired communicator 107 of the illumination device 100 receives the tag ID destined for the IP address and MAC address or the like corresponding to the illumination device 100 and outputs the tag ID to the controller 102.

The illumination device 100 emits light (tag ID light) modulated according to the tag ID and temporally changing in color. More specifically, the controller 102 of the illumination device 100 outputs the tag ID that is digital data to the encoder/modulator 110. The encoder/modulator 110 encodes the tag ID output from the controller 102 to create a bit data string, and executes digital modulation based on the bit data string. The driver 112 creates drive signals corresponding to the signals output from the encoder/modulator 110 and used for temporally changing the color of light emitted by the transmitter 114. The transmitter 114 emits tag ID light that is a light temporally changing in color in accordance with the drive signals output from the driver 112.

Figure 7:
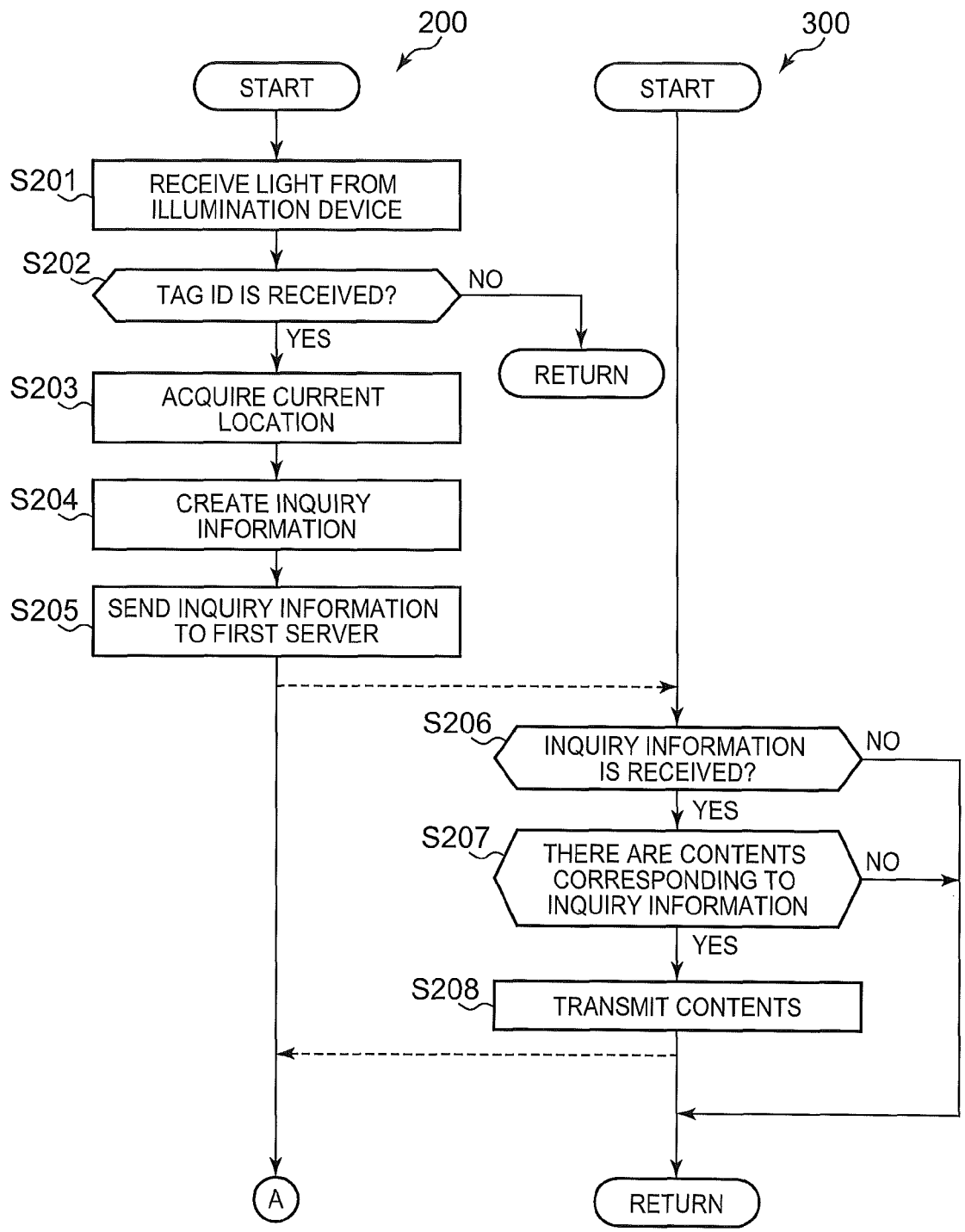
FIG. 7 is a flowchart showing an example of the information provision operation of the information provision system according to the embodiment.
Figure 8:
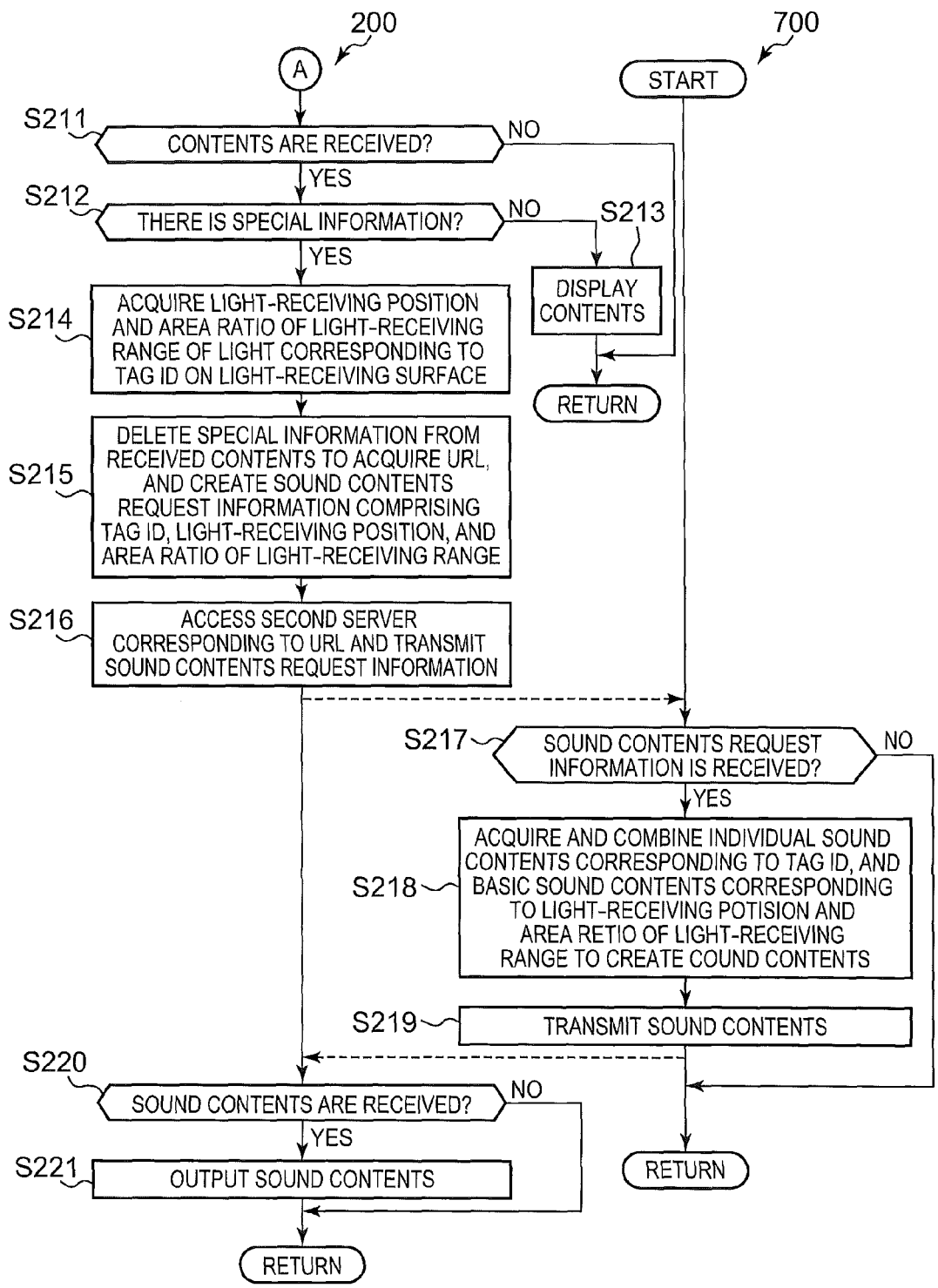
FIG. 8 is a flowchart showing an example of the information provision operation of the information provision system according to the embodiment.

Subsequently, the operation of the information provision system 1 as shown in FIGS. 7 and 8 is executed. As shown in FIG. 7, the portable terminal 200 receives light from an illumination device 100 (Step S201).

In the Step S201, the imager 214 of the portable terminal 200 captures an optical image entering via the lens 212 and containing tag ID light, and converts the image signals within the imaging field angle to digital data to create a frame. Furthermore, the imager 214 temporally successively captures an image and creates a frame, outputs the successive frames to the image processor 216, and sequentially stores and updates the successive frames in the buffer 218.

Then, the portable terminal 200 determines whether a tag ID is received (Step S202). In the Step S202, if the same coordinates in a given quantity of frames are color change coordinates showing a given color change, the imager 214 of the portable terminal 200 associates, stores, and updates the color change coordinates and a bit data string presenting the temporal color change mode of the coordinates in the given quantity of frames in the coordinates data list created in the buffer 218. Furthermore, the decoding processor 220 decodes the bit data string presenting the color change mode stored in the coordinates data list in the buffer 218 and outputs the decoded data to the controller 202. The identification information acquirer 232 of the controller 202 determines that a tag ID is received when the decoded data has the tag ID format.

If no tag ID is received (Step S202; NO), a series of operation ends. On the other hand, if a tag ID is received (Step S202; YES), the current location of the portable terminal 200 itself at the time of receiving the tag ID is selected and successively acquires its own current location. (Step S203). In the Step S203, the GPS receiver 222 of the portable terminal 200 measures the current location (latitude and longitude) of the portable terminal 200 based on signals from a GPS satellite and outputs the current location to the controller 202. The location information acquirer 234 of the controller 202 acquires the location information of the portable terminal 200.

Then, the portable terminal 200 creates inquiry information (Step S204). In the Step S204, the controller 202 creates inquiry information containing the terminal ID that is the identification information of the portable terminal 200, acquired location information of the portable terminal 200, and acquired tag ID as shown in FIG. 9.

Then, the portable terminal 200 sends the inquiry information to the first server 300 (Step S205). In the Step S205, the controller 202 of the portable terminal 200 outputs the inquiry information to the wireless communicator 208 and further outputs to the wireless communicator 208 the IP address and MAC address or the like corresponding to the first server 300.

Here, the IP address and MAC address or the like corresponding to the first server 300 can be stored in the memory 204 in advance or can be sent from the illumination device 100 along with the tag ID. The wireless communicator 208 encodes and modulates the inquiry information destined for the IP address and MAC address or the like corresponding to the first server 300 and transmits the radio signals via the antenna 210.

Then, the first server 300 determines whether any inquiry information is received (Step S206). In the Step S206, the wired communicator 308 of the first server 300 receives the inquiry information destined for the IP address and MAC address or the like corresponding to the first server 300 and outputs the inquiry information to the controller 302. The controller 302 determines whether any inquiry information is entered.

If no inquiry information is received (Step S206; NO), a series of operation ends. On the other hand, if any inquiry information is received (Step S206; YES), then, the first server 300 determines whether there are any contents corresponding to the received inquiry information (Step S207). If there is any device information containing the selected tag ID in the device information stored in the memory 304, the information-to-provide determiner 316 determines that there are some contents corresponding to the received inquiry information.

If there are no contents corresponding to the received inquiry information (Step S207; NO), a series of operation ends. On the other hand, if there are some contents corresponding to the received inquiry information (Step S207; YES), the first server 300 sends the contents to the portable terminal 200 (Step S208). In the Step S208, the information-to-provide determiner 316 extracts the contents corresponding to the selected tag ID in the device information. Furthermore, the information-to-provide determiner 316 outputs the extracted contents to the wired communicator 308 with the addition of the selected tag ID, and further outputs to the wired communicator 308 the IP address and MAC address or the like corresponding to the portable terminal 200 that is the transmission source of the received inquiry information. Here, the IP address and MAC address or the like corresponding to the portable terminal 200 is information contained as the transmission source of the inquiry information. The wired communicator 308 outputs the contents destined for the IP address and MAC address or the like corresponding to the portable terminal 200 to the communication network 500.

Subsequently, as shown in FIG. 8, the portable terminal 200 determines whether any contents are received (Step S211). In the Step S211, the wireless communicator 208 of the portable terminal 200 receives radio signals via the antenna 210. Then, the wireless communicator 208 demodulates and decodes the received signals to acquire the contents. Furthermore, the wireless communicator 208 outputs the contents to the controller 202. The controller 202 determines whether any contents are entered.

If no contents are received (Step S211; NO), a series of operation ends. On the other hand, if any contents are received (Step S211; Yes), the portable terminal 200 determines whether the contents contain special information (Step S212). In this embodiment, if the contents from the first server 300 are those used for acquiring sound contents of the second server 700, the contents contain a URL (uniform resource locator) that is information specifying the location of the second server 700 on the network and further contain a given character string such as "ISC (image sensor communication)" at the beginning of the URL as the special information for nullifying the URL. The controller 202 analyzes the contents and determines whether the contents contain the special information.

If the contents contain no special information (Step S212; NO), it is determined that the contents are not those used for acquiring sound contents of the second server 700, but those for displaying an image or the like. In such a case, the portable terminal 200 displays the received contents (Step S213). In the Step S213, the controller 202 of the portable terminal 200 outputs image signals corresponding to the contents to the display 207. The display 207 displays an image according to the image signals output from the controller 202.

On the other hand, if the contents contain the special information (Step S212; YES), the portable terminal 200 acquires the light-receiving position and light-receiving range presenting the position and range at which and over which the light corresponding to the tag ID is received in the Step S201, respectively, on the light-receiving surface 215 on which multiple light-receiving elements are arrayed (Step S214). In the Step S214, the light-receiving position/range acquirer 236 of the controller 202 trisects the light-receiving surface 215 in the vertical direction and in the horizontal direction to create nine regions or light-receiving positions 1 to 9 as shown in FIG. 10. Furthermore, the light-receiving position/range acquirer 236 identifies the position where the color change coordinates are determined in the Step S202, in other words identifies the light-receiving position containing the position at which the light corresponding to the tag ID is received among the light-receiving positions 1 to 9. Furthermore, the light-receiving position/range acquirer 236 of the controller 202 calculates the area ratio of the range over which the light corresponding to the tag ID is received (light-receiving range) 901 to the light-receiving surface 215 as shown in FIG. 11.

Then, the portable terminal 200 deletes the special information from the received contents to acquire the URL of the second server 700. Furthermore, the portable terminal 200 creates sound contents request information comprising the tag ID, light-receiving position, and area ratio of the light-receiving range as shown in FIG. 12 (Step S215). In the Step S215, the sound contents acquirer 238 of the controller 202 deletes the special information added at the beginning of the URL from the contents from the first server 300 to extract the remaining URL. Furthermore, the sound contents acquirer 238 associates the tag ID added to the contents from the first server 300 and the light-receiving position and area ratio acquired in the Step S214 in regard to the light corresponding to the tag ID to create the sound contents request information shown in FIG. 12.

Then, the portable terminal 200 accesses the second server 700 corresponding to the acquired URL and sends the sound contents request information (Step S216). In the Step S216, the sound contents acquirer 238 of the controller 202 accesses the second server 700 via the wireless communicator 208 based on the acquired URL. Furthermore, the sound contents acquirer 238 outputs the sound contents request information to the wireless communicator 208 and further outputs to the wireless communicator 208 the IP address and MAC address or the like corresponding to the second server 700 uniquely specified by the URL. The wireless communicator 208 encodes and modulates the sound contents request information destined for the IP address and MAC address or the like corresponding to the second server 700 and transmits the radio signals via the antenna 210.

The second server 700 determines whether any sound contents request information is received (Step S217). In the Step S217, the wired communicator 708 of the second server 700 receives the sound contents request information destined for the IP address and MAC address or the like corresponding to the second server 700 and outputs the sound contents request information to the controller 702. The controller 702 determines whether any sound contents request information is entered.

If no sound contents request information is received (Step S217; NO), a series of operation ends. On the other hand, if any sound contents request information is received (Step S217; YES), then, the second server 700 acquires and combines individual sound contents corresponding to the tag ID in the received sound contents request information and basic sound contents corresponding to the light-receiving position and area ratio to create sound contents (Step S218).

The memory 704 of the second server 700 stores individual sound contents information associating a tag ID with individual sound contents as shown in FIG. 13. In this embodiment, the individual sound contents are sound information for giving information about the location where the illumination device 100 emitting the light corresponding to the associated tag ID is installed. In this embodiment, the individual sound contents associated with the tag ID corresponding to the light emitted by the illumination device 100-1 is sound information giving information that there is an emergency exit 810 at the location of the illumination device 100-1. Furthermore, the individual sound contents associated with the tag ID corresponding to the light emitted by the illumination device 100-2 is sound information giving information that there is a restroom door 820 at the location of the illumination device 100-2. Furthermore, the individual sound contents associated with the tag ID corresponding to the light emitted by the illumination device 100-3 is sound information giving information that there is a step 830 at the location of the illumination device 100-3.

Furthermore, the memory 704 of the second server 700 stores first basic sound contents information associating the light-receiving positions with first basic sound contents as shown in FIG. 14. In this embodiment, the first basic sound contents are sound information presenting the direction of the installation location of each illumination device 100 when seen from the portable terminal 200. The direction of the installation location of each illumination device 100 when seen from the portable terminal 200 coincides with the direction of the light-receiving position of the light corresponding to the tag ID emitted by the illumination device 100 when seen from the center of the light-receiving surface 215. Therefore, as shown in FIG. 14, the light-receiving positions 1 to 9 are associated with the first basic sound contents presenting the directions of the light-receiving positions of the light corresponding to the tag ID emitted by the illumination device 100 when seen from the center of the light-receiving surface 215. For example, in FIG. 10, if the light corresponding to the tag ID emitted by the illumination device 100 is received at the light-receiving position 1, it is assumed that the installation location of the illumination device 100 is situated in the upper left direction when seen from the portable terminal 200. Therefore, as shown in FIG. 14, the light-receiving position 1 and the first basic sound contents "upper left" are associated.

Furthermore, the memory 704 of the second server 700 stores second basic sound contents information associating the area ratio of the light-receiving range 901 to the entire light-receiving surface 215 with second basic sound contents. In this embodiment, the second basic sound contents are sound information presenting the distance from the portable terminal 200 to the installation location of the illumination device 100. For example, as the light-receiving range 901 on the light-receiving surface 215 shown in FIG. 11 is larger, in other words as the area ratio of the light-receiving range 901 to the entire light-receiving surface 215 is higher, presumably, the installation location of the illumination device 100 emitting that light is closer to the portable terminal 200. Therefore, as shown in FIG. 15, the larger light-receiving range is associated with the second basic sound contents presenting a smaller distance. For example, as shown in FIG. 15, the area ratio is associated with second sound contents "very close" if the area ratio of the light-receiving range to the light-receiving surface 215 is 30% or higher, and the area ratio is associated with second sound contents "far" if the area ratio of the light-receiving range is lower than 5%.

In the Step S218, the information-to-provide determiner 716 of the controller 702 extracts the tag ID contained in the sound contents request information and acquires the individual sound contents associated with the tag ID. Furthermore, the information-to-provide determiner 716 extracts the light-receiving position contained in the sound contents request information and acquires the first sound contents associated with the light-receiving position. Furthermore, the information-to-provide determiner 716 extracts the area ratio of the light-receiving range contained in the sound contents request information and acquires the second sound contents associated with the area ratio. Furthermore, the information-to-provide determiner 716 combines the acquired individual sound contents, first basic sound contents, and second basic sound contents to create sound contents for giving information about the object present at the location whether the illumination device 100 emitting the light corresponding to the tag ID is installed and the direction and distance of the object when seen from the portable terminal 200. For example, if the sound contents request information contains the tag ID corresponding to the light emitted by the illumination device 100-3 installed at the location of the step 830, a light-receiving position 9, and an area ratio of lower than 5%, the information-to-provide determiner 716 creates sound contents "there is a step far in the lower right direction."

Returning to FIG. 8, the explanation will further be made. The second server 700 sends the created sound contents to the portable terminal 200 (Step S219). In the Step S219, the information-to-provide determiner 716 outputs the created sound contents to the wired communicator 708 and further outputs to the wired communicator 708 the IP address and MAC address or the like corresponding to the portable terminal 200 that is the transmission source of the received sound contents request information. Here, the IP address and MAC address or the like corresponding to the portable terminal 200 is information contained as the transmission source of the sound contents request information. The wired communicator 708 outputs the sound contents destined for the IP address and MAC address or the like corresponding to the portable terminal 200 to the communication network 500.

Subsequently, the portable terminal 200 determines whether any sound contents are received (Step S220). In the Step S220, the wireless communicator 208 of the portable terminal 200 receives radio signals via the antenna 210. Then, the wireless communicator 208 demodulates and decodes the received signals to acquire the sound contents. Furthermore, the wireless communicator 208 outputs the sound contents to the controller 202. The controller 202 determines whether any sound contents are entered.

If no sound contents are received (Step S220; NO), a series of operation ends. On the other hand, if any sound contents are received (Step S220; YES), the portable terminal 200 outputs the sound contents (Step S221). In the Step S221, the controller 202 of the portable terminal 200 outputs sound signals corresponding to the sound contents to the speaker 228 or headphone 230 via the switch 226. The speaker 228 or headphone 230 outputs sound according to the entered sound signals.

As described above, in the information provision system 1 of this embodiment, when the contents from the first server 300 contain special information, the portable terminal 200 sends to the second server 700 sound contents request information comprising the tag ID corresponding to the light received from the illumination device 100, light-receiving position on the light-receiving surface 215, and area ratio of the light-receiving range to the entire light-receiving surface in order to acquire sound contents. The second server 700 combines the individual sound contents corresponding to the tag ID in the sound contents request information, first basic sound contents corresponding to the light-receiving position, and second basic sound contents corresponding to the area ratio to create sound contents for giving information about the object present at the location whether the illumination device 100 emitting the light corresponding to the tag ID is installed and the direction and distance of the object when seen from the portable terminal 200, and sends the sound contents to the portable terminal 200. Furthermore, the portable terminal 200 outputs sound corresponding to the received sound contents.

Consequently, even when the user 400 cannot visually recognize the location of the illumination device 100, the user 400 can acknowledge what is present at the location of the illumination device 100; then, it is possible to provide effective information.

Furthermore, since different sound contents are provided depending on the light-receiving position and area ratio on the light-receiving surface 215, the user 400 can acknowledge the direction and distance of the illumination device 100; then, it is possible to provide more effective information.

Furthermore, when the contents from the first server 300 are used for acquiring the sound contents of the second server 700, the contents from the first server 300 contain the URL of the second server 700 and special information for nullifying the URL, whereby the portable terminal 200 can easily determine whether the contents from the first server 300 are those used for acquiring the sound contents of the second server 700. Furthermore, for accessing the second server 700, the URL of the second server can easily be acquired simply by deleting the special information.

The present invention is not confined to the above description and drawings of an embodiment. The above-described embodiment and drawings can be modified as appropriate. For example, in the above-described embodiment, the information provision system 1 comprises the first server 300 and second server 700. However, the information provision system 1 can comprise a single server having the functions of these servers.

Furthermore, the correspondence between the light-receiving positions and first basic sound contents and the correspondence between the area ratios and second basic sound contents are not restricted to those shown in FIGS. 14 and 15. For example, in the case of the light-receiving position being 8 and the area ratio being 30% or higher, it is possible to select basic sound contents "underfoot" instead of the combination of the first basic sound contents "down" and second basic sound contents "very close."

Furthermore, in FIG. 1, when light is received from the illumination devices 100-1 (emergency exit 810) and 100-2 (restroom door 820), it is possible to first output the sound contents corresponding to the light received first, or output the sound contents associated with the illumination device of which the light-receiving position is closer to the ends or lower (at one's feet) or of which the area ratio is higher with priority. "With the priority" in such a case means not only that the sound contents for the transmission device closer in distance to the portable terminal 200 are output temporally first but also that the sound contents for the transmission device closer in distance to the portable terminal 200 are output intentionally in a higher volume.

Furthermore, in the above-described embodiment, the transmitters 114 of the illumination devices 100-1 to 100-3 have the same light-emitting surface in shape and area. However, the light-emitting surface can be varied. In such a case, for example, the distance to the illumination device 100 can be calculated by the technique described in Japanese Patent No. 4210955.

Furthermore, for example, the functions of the illumination devices 100, portable terminal 200, first server 300, and second server 700 can be realized by a computer executing the programs. Furthermore, the programs for realizing the functions of the illumination devices 100, portable terminal 200, first server 300, and second server 700 can be stored on a recording medium such as a CD-ROM or downloaded to a computer via a network.

A preferred embodiment of the present invention is described above. The present invention is not confined to the above specific embodiment and the present invention includes the invention set forth in the scope of claims and the range equivalent thereto.

What is claimed is:

1. A terminal device in an information provision system including a transmission device, the terminal device, and a server system providing information-to-provide to the terminal device, the terminal device comprising:
   a light receiver comprising a light-receiving surface comprising multiple light-receiving elements two-dimensionally arrayed;
   a controller which functions as:
      an identification information acquirer demodulating light transmitted from the transmission device and received by the light receiver to acquire identification information; and
      a light-receiving condition acquirer acquiring at least one of (i) position information indicating a position of the light-receiving surface where the light is received and (ii) range information indicating a range of the light-receiving surface over which the light is received, when the light receiver receives the light from the transmission device; and
   a transmitter transmitting the identification information acquired by the identification information acquirer and the at least one of the position information and the range information acquired by the light-receiving condition acquirer to the server system.

2. The terminal device according to claim 1, wherein the controller further functions as:
   a content acquirer acquiring content information corresponding to the identification information acquired by the identification information acquirer; and
   a determiner determining whether the content information contains specific information, and
   wherein the transmitter transmits the content information acquired by the content acquirer and the at least one of the position information and the range information acquired by the acquirer to the server system when the determiner determines that the content information contains the specific information.

3. The terminal device according to claim 2, wherein:
   the content information is information for defining a location of the server system on a network,
   the specific information is information for nullifying the information for defining the location by adding a character string to the information for defining the location, and
   the transmitter deletes the character string added to the information for defining the location to make the information for defining the location usable by the terminal device.

4. The terminal device according to claim 1, further comprising:
   a receiver receiving the information-to-provide from the server;
   wherein the controller further controls an output of the terminal device based on the information-to-provide received by the receiver.

5. The terminal device according to claim 4, wherein the information-to-provide comprises sound information, and the controller controls the terminal device to output sound based on the sound information received by the receiver.

6. An information provision method of a terminal device in an information provision system including a transmission device, the terminal device, and a server system providing information-to-provide to the terminal device, the method comprising:
   a light reception step of receiving light from the transmission device with a light receiver comprising a light-receiving surface comprising multiple light-receiving elements two-dimensionally arrayed;
   an identification information acquisition step of demodulating the light received in the light reception step to acquire identification information;
   a light-receiving condition acquisition step of acquiring at least one of (i) position information indicating a position of the light-receiving surface where the light is received and (ii) range information indicating a range of the light-receiving surface over which the light is received, when the light is received from the transmission device by the light receiver in the light reception step;
   a transmission step of transmitting the identification information acquired in the identification information acquisition step and the at least one of the position information and the range information acquired in the light-receiving condition acquisition step to the server system;
   a reception step of receiving the information-to-provide transmitted by the server system in response to the transmitting of the identification information and the at least one of the position information and the range information in the transmission step; and
   an output step in which the terminal device outputs sound based on the information-to-provide received in the reception step.

7. A non-transitory computer-readable recording medium having a program recorded thereon for controlling a computer of a terminal device in an information provision system, the information provision system including a transmission device, the terminal device, and a server system providing information-to-provide to the terminal device, and the program being executable to control the computer to function as:
   an identification information acquirer demodulating light transmitted from the transmission device and received by a light receiver comprising a light-receiving surface comprising multiple light-receiving elements two-dimensionally arrayed to acquire identification information;
   a light-receiving condition acquirer acquiring at least one of (i) position information indicating a position of the light-receiving surface where the light is received and (ii) range information indicating a range of the light-receiving surface over which the light is received, when the light receiver receives the light from the transmission device;
a transmitter transmitting the identification information acquired by the identification information acquirer and the at least one of the position information and the range information acquired by the light-receiving condition acquirer to the server system;
a receiver receiving the information-to-provide transmitted by the server system in response to the transmitting of the identification information and the at least one of the position information and the range information by the transmitter; and
an output controller controlling the terminal device to output sound based on the information-to-provide received by the receiver.

\* \* \* \* \*